(12) United States Patent
Jeon et al.

(10) Patent No.: US 11,979,866 B2
(45) Date of Patent: May 7, 2024

(54) APPARATUS AND METHOD FOR CHANNEL SOUNDING BASED ON AGGREGATED PHYSICAL PROTOCOL DATA UNIT

(71) Applicant: SAMSUNG ELECTRONICS CO., LTD., Suwon-si (KR)

(72) Inventors: Eunsung Jeon, Seoul (KR); Wookbong Lee, San Jose, CA (US); Myeongjin Kim, Seoul (KR); Chulho Chung, Yongin-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 17/467,742

(22) Filed: Sep. 7, 2021

(65) Prior Publication Data
US 2022/0078792 A1 Mar. 10, 2022

Related U.S. Application Data

(60) Provisional application No. 63/091,441, filed on Oct. 14, 2020, provisional application No. 63/076,556, filed on Sep. 10, 2020.

(30) Foreign Application Priority Data

Mar. 4, 2021 (KR) .................. 10-2021-0029066

(51) Int. Cl.
*H04L 12/28* (2006.01)
*H04W 72/0453* (2023.01)
(Continued)

(52) U.S. Cl.
CPC ........ *H04W 72/0453* (2013.01); *H04W 84/12* (2013.01)

(58) Field of Classification Search
CPC ... B04B 7/0417; B04B 7/0626; H04L 5/0044; H04L 27/2603; H04L 69/18; H04W 72/0453; H04W 84/12
(Continued)

(56) References Cited

U.S. PATENT DOCUMENTS 10,772,099 B2 9/2020 Verma et al.
10,848,233 B2 11/2020 Vermani et al.
(Continued)

FOREIGN PATENT DOCUMENTS

| JP | 2020-141308 | 9/2020 |
| KR | 10-2020-0070248 | 6/2020 |
| WO | 2020180049 | 9/2020 |

OTHER PUBLICATIONS

IEEE802.11-20/1317r0, SIG contents discussion for EHT sounding NDP (14 pages).
(Continued)

*Primary Examiner* — John Pezzlo
(74) *Attorney, Agent, or Firm* — F. CHAU & ASSOCIATES, LLC

(57) ABSTRACT

The present disclosure provides a wireless communication method. The wireless communication method includes a first apparatus communicating with at least one second apparatus in a wireless local area network (WLAN) system. The wireless communication method generates an aggregated physical layer protocol data unit (PPDU) including a first null data packet (NDP) based on a first protocol standard and a second NDP based on a second protocol standard and transmits the aggregated PPDU to the at least one second apparatus, wherein the first NDP and the second NDP have a same duration in different frequency bands.

20 Claims, 15 Drawing Sheets

(51) Int. Cl.
*H04J 1/16* (2006.01)
*H04W 84/12* (2009.01)

(58) Field of Classification Search
USPC .......................................... 370/252, 329, 430
See application file for complete search history.

(56) References Cited

U.S. PATENT DOCUMENTS

| | | |
|---|---|---|
| 2016/0007325 A1 | 1/2016 | Seok |
| 2018/0292518 A1* | 10/2018 | Chu .................... H04W 72/121 |
| 2018/0359761 A1* | 12/2018 | Chun .................... H04W 72/21 |
| 2019/0288895 A1 | 9/2019 | Chen et al. |
| 2020/0015219 A1 | 1/2020 | Asterjadhi et al. |
| 2020/0112350 A1 | 4/2020 | Yang et al. |
| 2020/0136884 A1 | 4/2020 | Park et al. |
| 2020/0145157 A1 | 5/2020 | Suh et al. |
| 2020/0153571 A1 | 5/2020 | Suh et al. |
| 2020/0177425 A1 | 6/2020 | Chen et al. |
| 2020/0213160 A1 | 7/2020 | Doostnejad et al. |
| 2020/0221545 A1 | 7/2020 | Stacey et al. |
| 2020/0228380 A1 | 7/2020 | Yang et al. |
| 2020/0296592 A1 | 9/2020 | Höhne et al. |
| 2021/0359885 A1* | 11/2021 | Shellhammer ...... H04L 27/2621 |
| 2021/0410131 A1* | 12/2021 | Lim ...................... H04L 1/0041 |
| 2022/0385403 A1* | 12/2022 | Song .................... H04W 76/15 |

OTHER PUBLICATIONS

IEEE 802.11-20/1238r0, Open Issues on Preamble Design (29 pages).
IEEE802.11-20/0693r1, Aggregated PPDU for Large BW (7 pages).
IEEE802.11-20/1015r1, EHT NDPA Frame Design Discussion (22 pages).
IEEE 802.11-20/0950r3, Partial Bandwidth Feedback for EHT (21 pages).
IEEE P802.11ac™/D2.0, Part 11: Wireless LAN Medium Access Control (MAC) and Physical Layer (PHY) Specifications (359 pages).
IEEE P802.11ax™/D6.1, Part 11: Wireless LAN Medium Access Control (MAC) and Physical Layer (PHY) Specifications (784 pages).
IEEE P802.11n, Part 11: Wireless LAN Medium Access Control (MAC) and Physical Layer (PHY) Specifications (2793 pages).

* cited by examiner

FIG. 7

| Field | Part | Subfield | Bits |
|---|---|---|---|
| U-SIG | U-SIG-1 | PHY Version Identifier | 3 |
| | | BW | 3 |
| | | UL/DL | 1 |
| | | BSS Color | 6 |
| | | TXOP | 7 |
| | | Disregard | 5 |
| | | Validate | 1 |
| | U-SIG-2 | PPDU Type And Compression Mode | 2 |
| | | Validate | 1 |
| | | Punctured Channel Info | 5 |
| | | Validate | 1 |
| | | EHT-SIG MCS | 2 |
| | | Number of EHT-SIG Symbols | 5 |
| | | CRC | 4 |
| | | Tail | 6 |

FIG. 8

| Field | Category | Subfield | Bits |
|---|---|---|---|
| EHT-SIG | Common Field | Spatial Reuse | 4 |
| | | GI+LTF Size | 2 |
| | | Number of EHT-LTF Symbols | 3 |
| | | NSS | 4 |
| | | Beamformed | 1 |
| | | Disregard | 4 |
| | | CRC | 4 |
| | | Tail | 6 |

FIG. 9A

| UL/DL | PPDU Type And Compression Mode | Description | EHT-SIG present? |
|---|---|---|---|
| 0 (DL) | 0 | DL OFDMA | Yes |
| | 1 | SU | Yes |
| | 2 | DL MU-MIMO | Yes |
| | 3 | NDP | No |
| 1 (UL) | 0 | DL OFDMA | No |
| | 1 | SU | Yes |
| | 2 | DL MU-MIMO | – |
| | 3 | NDP | No |

FIG. 9B

| UL/DL | PPDU Type And Compression Mode | Description | EHT-SIG present? |
|---|---|---|---|
| 0 (DL) | 0 | DL OFDMA | Yes |
| | 1 | SU | Yes |
| | 2 | DL MU-MIMO | Yes |
| | 3 | NDP | No |
| 1 (UL) | 0 | DL OFDMA | No |
| | 1 | SU | Yes |
| | 2-3 | Validate | – |

FIG. 10

| Field | Part | Subfield | | Bits |
|---|---|---|---|---|
| | | Non NDP | NDP | |
| U-SIG | U-SIG-1 | PHY Version Identifier | | 3 |
| | | BW | | 3 |
| | | UL/DL | | 1 |
| | | BSS Color | | 6 |
| | | TXOP | | 7 |
| | | Disregard | | 5 |
| | | Validate | | 1 |
| | U-SIG-2 | PPDU Type And Compression Mode | | 2 |
| | | Validate | | 1 |
| | | Punctured Channel Info | | 5 |
| | | Validate | | 1 |
| | | Non NDP | GI+LTF Size | 7 |
| | | Number of EHT-LTF Symbols | Number of EHT-LTF Symbols | |
| | | | GI+LTF Size | |
| | | CRC | | 4 |
| | | Tail | | 6 |

FIG. 11

| Type | U-SIG | |
| --- | --- | --- |
| | U-SIG-1 | U-SIG-2 |
| Non NDP | Q, -1, +1, I | Q, -1, +1, I |
| NDP | | Q, +1, -1, I |

FIG. 12

| Field | Subfield | Bits |
|---|---|---|
| U-SIG | ⋮ | ⋮ |
| | Packet Extension Duration | m |
| | ⋮ | ⋮ |

APPARATUS AND METHOD FOR CHANNEL SOUNDING BASED ON AGGREGATED PHYSICAL PROTOCOL DATA UNIT

CROSS-REFERENCE TO RELATED APPLICATIONS

This application is based on and claims the benefit of U.S. Provisional Patent Application Nos. 63/076,556 and 63/091,441, filed on Sep. 10, 2020 and Oct. 14, 2020, in the United States Patent and Trademark Office, and claims priority under 35 U.S.C. § 119 to Korean Patent Application No. 10-2021-0029066, filed on Mar. 4, 2021, in the Korean Intellectual Property Office, the disclosures of which are incorporated by reference herein in their entirety.

BACKGROUND

The inventive concept relates to wireless communication, and more particularly, to an apparatus and method for channel sounding based on an aggregated physical layer protocol data unit (PPDU).

A wireless communication system is a system used to communicate data or information using electromagnetic waves between electronic devices. Mobile phones, computers, and navigation systems use wireless communication to send and receive information between devices. The wireless communication system may include a wireless local area network (WLAN).

The WLAN is a technology for connecting two or more devices to each other using a wireless signal transmission method, may be based on the Institute of Electrical and Electronics Engineers (IEEE) 802.11 wireless communication standard. The 802.11 standard can include standards such as 802.11b, 802.11a, 802.11g, 802.11n, 802.11ac, and 802.11ax, and may support transmission rates of up to 1 Gbyte/s based on orthogonal frequency-division multiplexing (OFDM) technology.

In 802.11ac, data may be simultaneously transmitted to multiple users through a multi-user multi-input multi-output (MU-MIMO) technique. In 802.11ax, which is referred to as high efficiency (HE), multiple access is implemented by applying not only MU-MIMO but also an orthogonal frequency-division multiple access (OFDMA) technology and dividing and providing available subcarriers to users. As a result, a WLAN system using 802.11ax may effectively support communication in dense areas and outdoors.

The 802.11be standard, referred to as extremely high throughput (EHT), is intended to implement support of 6 GHz unlicensed frequency band, provide bandwidth utilization of up to 320 MHz per channel, introduce hybrid automatic repeat and request (HARQ), and support up to 16×16 MIMO. As a result, a next-generation WLAN system may effectively support low latency and high-speed transmission (e.g., such as new radio (NR), which is a 5G technology). Therefore, there is a need in the art for improved transmission between devices using wireless communication.

SUMMARY

The inventive concept provides an apparatus and method for efficient channel sounding in a wireless communication system.

According to an aspect of the inventive concept, there is provided a method in which a first apparatus communicates with at least one second apparatus in a wireless local area network (WLAN) system including generating an aggregated physical layer protocol data unit (PPDU) including a first null data packet (NDP) based on a first protocol standard and a second NDP based on a second protocol standard; and transmitting the aggregated PPDU to the at least one second apparatus, wherein the first NDP and the second NDP have a same duration and are transmitted in different frequency bands.

According to another aspect of the inventive concept, there is provided a first apparatus for communicating with at least one second apparatus in a WLAN system including a transceiver; and a processing circuitry configured to generate an aggregated PPDU including a first NDP based on a first protocol standard and a second NDP based on a second protocol standard and transmit the aggregated PPDU to the at least one second apparatus through the transceiver, and the first NDP and the second NDP have a same duration in different frequency bands.

According to another aspect of the inventive concept, there is provided a second apparatus for communicating with at least one second apparatus in a WLAN system, the second apparatus including a transceiver; and processing circuitry configured to receive, from the first apparatus through the transceiver, an aggregated PPDU including a first NDP based on a first protocol standard and a second NDP based on a second protocol standard and estimate a channel based on the first NDP, wherein the first NDP and the second NDP have a same duration in different frequency bands.

According to another aspect of the inventive concept, there is provided a method for wireless communication, the method comprising generating an aggregated physical layer protocol data unit (PPDU) comprising a first null data packet (NDP) based on a first protocol standard and a second NDP based on a second protocol standard, wherein the first NDP and the second NDP have a same duration; transmitting the aggregated PPDU using a first frequency band for the first NDP and a second frequency band for the second NDP; receiving first feedback from a first station using the first protocol standard and second feedback from a second station using the second protocol; and performing beamforming communications with the first station according to the first protocol based on the first feedback and with the second station according to the second protocol based on the second feedback

BRIEF DESCRIPTION OF THE DRAWINGS

Embodiments of the inventive concept will be more clearly understood from the following detailed description taken in conjunction with the accompanying drawings in which:

FIG. 7 is a diagram illustrating an example of a universal signal (U-SIG) field according to an embodiment of the inventive concept;

FIG. 8 is a diagram illustrating an example of an extremely high throughput-signal (EHT-SIG) field according to an embodiment of the inventive concept;

FIGS. 9A and 9B are diagrams illustrating examples of subfields included in a U-SIG field according to embodiments of the inventive concept;

FIG. 10 is a diagram illustrating an example of a U-SIG field according to an embodiment of the inventive concept;

FIG. 11 is a diagram illustrating an example of a U-SIG field according to an embodiment of the inventive concept;

FIG. 12 is a diagram illustrating an example of a U-SIG field according to an embodiment of the inventive concept;

DETAILED DESCRIPTION OF THE EMBODIMENTS

Figure 1:
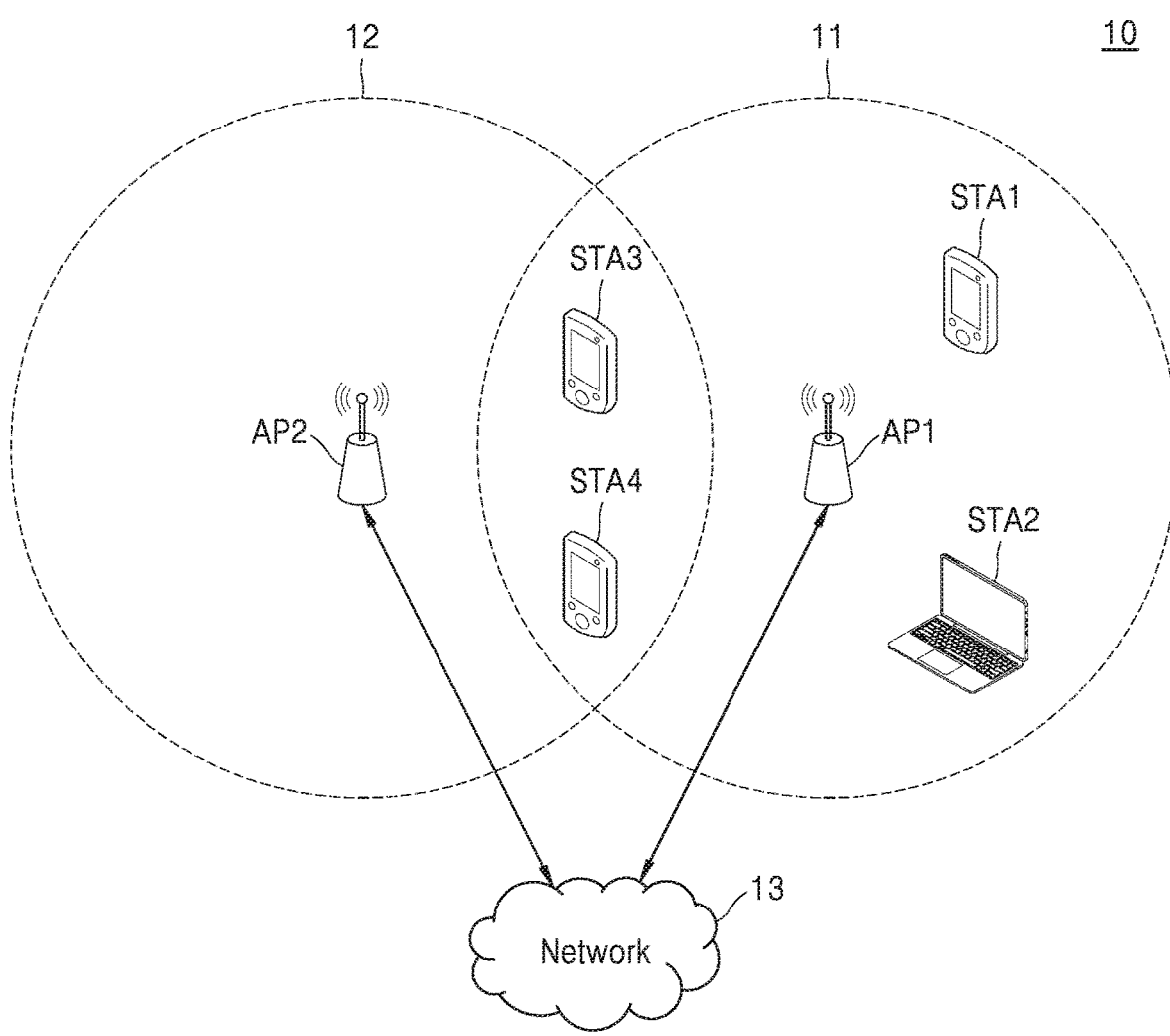
FIG. 1 is a diagram illustrating a wireless communication system according to an embodiment of the inventive concept.

The present disclosure relates generally to wireless communication. More particularly, the present disclosure relates to an apparatus and method for channel sounding based on an aggregated physical layer protocol data unit (PPDU). In some embodiments, the present disclosure provides a sounding null data packet (NDP) using an aggregated PPDU. Subfields used for the NDP are included in another field of the NDP. Therefore, the NDP includes a field (e.g., universal signal (U-SIG) field) in which two or more fields are merged. At least one of fields included in the non-NDP may be omitted from the NDP to secure the same duration as the NDP based on the 802.11 standard.

For example, some wireless communication systems (e.g., the 802.11 standard) may support communications using beamformed transmission. For instance, in high efficiency (HE) (e.g., 802.11.ax) beamforming, an access point (AP) sequentially transmits a HE null data packet announcement (NDPA) frame, a HE null data packet (NDP), and a HE beamforming report poll (BFRP) to a station (STA). The STA may then transmit HE compressed beamforming/channel quality indicator (CQI) including channel information to the AP.

One or more aspects of the techniques described herein provide a sounding NDP using an aggregated A-PPDU. In order to implement the same duration as the NDP based on the legacy 802.11 standard, at least one field included in the non-NDP may be omitted from the NDP. Among the subfields included in the omitted field, subfields utilized for the NDP may be included in another field of the NDP. Accordingly, the NDP may include a field (e.g., U-SIG field) in which two or more fields are merged. In addition, in order to utilize the U-SIG field in different formats in the non-NDP and the NDP, at least one subfield included in the U-SIG field may define the NDP as a PPDU type.

In order to match the NDP duration, the duration of a packet extension (PE) field may be adjusted, and the U-SIG field may include a subfield indicating the duration of the PE field. In addition, in order to prevent automatic gain control (AGC) delay, symbols of U-SIG may be modulated in quadrature phase shift keying (QPSK) and quadrature binary phase shift keying (QBPSK). In some examples, a sounding dialog token field of the NDPA may have a value that commonly indicates a protocol (e.g., 802.11 standards) of NDPs included in the A-PPDU.

In some aspects, the wireless communication method of the present disclosure includes a first apparatus communicating with at least one second apparatus in a wireless local area network (WLAN) system. The wireless communication method includes generating an aggregated PPDU including a first NDP based on a first protocol standard and a second NDP based on a second protocol standard. The wireless communication method further includes transmitting the aggregated PPDU to the at least one second apparatus, where the first NDP and the second NDP have a same duration in different frequency bands (e.g., the first NDP and the second NDP may be transmitted in different frequency bands, where each of the first NDP and the second NDP have a same duration).

FIG. 1 is a diagram illustrating a wireless communication system 10 according to an embodiment of the inventive concept. FIG. 1 illustrates a WLAN system as an example of the wireless communication system 10.

Advantages and features of the inventive concept and a method of achieving the advantages and the features will be clarified with reference to embodiments described in detail with the accompanying drawings. However, the inventive concept is not limited to the embodiments illustrated hereinafter and is implemented in various forms. The current embodiments make the inventive concept complete. Additionally, or alternatively, the inventive concept is provided to completely inform those skilled in the art the scope of the inventive concept and is defined by claims. Specific configurations described in the embodiments of the inventive concept may be used in other embodiments. Like reference numerals refer to like elements throughout.

Terms used herein are for describing embodiments and are not for limiting the inventive concept. Herein, a singular form includes a plural form unless specially described. Described components, processes, operations and/or elements do not exclude the presence or addition of one or more other components, processes, operations and/or elements.

Unless otherwise defined, all the terms (including technological and scientific terms) used herein may be used in the meaning that may be commonly understood by those skilled in the art. Additionally, or alternatively, terms defined in a commonly used dictionary are not ideologically or excessively interpreted unless specially defined.

Additionally, or alternatively, orthogonal frequency division multiplexing (OFDM) or an OFDM-based wireless communication system, in particular, the IEEE 802.11 standard is to be mainly described. However, the gist of the inventive concept may be slightly modified and applied to other communication systems with a similar technological background and channel type (for example, a cellular communication system such as long term evolution (LTE), LTE-Advanced (LTE-A), new radio (NR), wireless broadband (WiBro), or global system for mobile communication (GSM) or a remote communication system such as Bluetooth or near field communication (NFC) without remarkably deviating from a range of the inventive concept by those skilled in the art.

Before performing a detailed description, it is preferable to define predetermined words and phrases used in the present disclosure. "Connects (combines)" and derivatives thereof refer to direct or indirect communication between two or more components that physically contact or do not physically contact. The terms "transmits", "receives", and "communicates" and derivatives thereof include all direct and indirect communication. "Comprises" and/or "comprising" used herein mean inclusion without limit. "Or" is a collective term meaning 'and/or'. "is related to . . . " and derivatives thereof mean includes, is included in . . . ', 'is connected to . . . ', 'implies', 'is implied in . . . ', 'is connected to . . . ', 'is combined with . . . ', 'may communicate with . . . ', 'cooperates with . . . ', 'interposes', 'puts in parallel', 'is close to . . . ', 'is bound to . . . ', 'has', 'has a feature of . . . ', and has 'a relation with . . . '. "a controller" means a certain device, system, or a part thereof controlling at least one operation. The controller may be implemented by hardware or a combination of hardware and software and/or firmware. A function related to a specific controller may be locally or remotely concentrated or dispersed. "At least one . . . " means that, when a list of items is used, one or more different combinations of the items may be used and only one item in the list may be used. For example, "at least one of A, B, and C" include one of the combinations of A, B, C, and A and B, A and C, B and C, and A and B and C.

Additionally, or alternatively, various functions described hereinafter may be implemented or supported by one or more computer programs and each of the programs is formed of computer-readable program code and is executed in a computer-readable recording medium. "An application" and "a program" refer to one or more computer programs, software components, instruction sets, processes, functions, objects, classes, instances, related data, or parts thereof suitable for implementation of pieces of computer-readable program code. "Computer-readable program code" include all types of computer code including a source code, object code, and execution code. "Computer-readable media" include all types of media that may be accessed by a computer such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-temporary computer-readable media include a medium in which data may be permanently stored and a medium in which data may be stored and may be overwritten later such as a rewritable optical disk or a deletable memory device.

In various embodiments of the inventive concept described hereinafter, a hardware access method will be described as an example. However, in various embodiments of the inventive concept, because a technology using both hardware and software is included, various embodiments of the inventive concept do not exclude a software-based access method.

Additionally, or alternatively, a term referring to control information used in the following description, a term referring to an entry, a term referring to a network entity, a term referring to a message, and a term referring to a component of a device are illustrated for convenience sake. Therefore, the inventive concept is not limited to the following terms and other terms with the same technical meaning may be used.

Referring to FIG. 1, the wireless communication system 10 may include first and second access points AP1 and AP2, a first station STA1, a second station STA2, a third station STA3, and a fourth station STA4. The first and second access points AP1 and AP2 may connect to a network 13 including the Internet, an Internet protocol (IP) network, or any other network. The first access point AP1 may provide access to the network 13 within a first coverage area 11 to the first station STA1, the second station STA2, the third station STA3, and the fourth station STA4, and the second access point AP2 may also provide access to the network 13 within a second coverage area 12 to the third and fourth stations STA3 and STA4. In some embodiments, the first and second access points AP1 and AP2 may communicate with at least one of the first station STA1, the second station STA2, the station STA3, and the fourth station STA4 based on wireless fidelity (Wi-Fi) or any other WLAN access technology.

An access point may be referred to as a router, a gateway, etc., and a station may be referred to as a mobile station, a subscriber station, a terminal, a mobile terminal, a wireless terminal, user equipment, a user, etc. The station may be a portable device, such as a mobile phone, a laptop computer, a wearable device, etc., or a stationary device, such as a desktop computer, a smart TV, etc. Herein, the access point may be referred to as a first apparatus, and the station may be referred to as a second apparatus or a third apparatus. Examples of the access point and the station will be described below with reference to FIG. 14.

The access point may allocate at least one resource unit (RU) to at least one station. The access point may transmit data through at least one allocated resource unit, and at least one station may receive data through at least one allocated resource unit. In 802.11ax (hereafter HE), the access point may allocate a single resource unit to at least one station, while in 802.11be (hereafter EHT) or next-generation IEEE 802.11 standards (hereafter EHT+), the access point may allocate a multi-resource unit (MRU) including two or more resource units to at least one station. For example, the first access point AP1 may allocate the MRU to at least one of the first station STA1, the second station STA2, the third station STA3, and the fourth station STA4 and may transmit data through the allocated MRU.

In some embodiments, the access point may communicate with the at least one station based on beamforming. For example, single-user beamforming may improve the reception performance of a single user, and multi-user beamforming may improve the overall reception performance of multiple users by removing interference between multiple users. The access point and the station may perform channel sounding for beamforming, and channel sounding may be based on a sounding protocol. As will be described later with reference to the drawings, even when the access point performs channel sounding with stations supporting various protocol standards (e.g., HE, EHT, EHT+, etc.), the access point and the stations may efficiently perform channel sounding.

In some examples, the wireless communication system 10 may specify explicit beamforming techniques where a channel sounding process is used to receive channel state information (CSI) feedback from a receiver to a transmitter. For instance, an access point (e.g., access point AP1) may send a sounding packet, which may be referred to as a null data packet (NDP) (e.g., a packet including only preambles and no data) to a wireless station (e.g., STA 1). The wireless station, upon receiving the NDP, may perform channel estimation and may feedback compressed CSI to the access point. The access point (e.g., the transmitter) may receive the compressed beamforming frame including the channel state information and may use the information to shape transmission beams so as to precisely steer the access point's transmitted energy toward the wireless station (e.g., the receiver).

Figure 2:
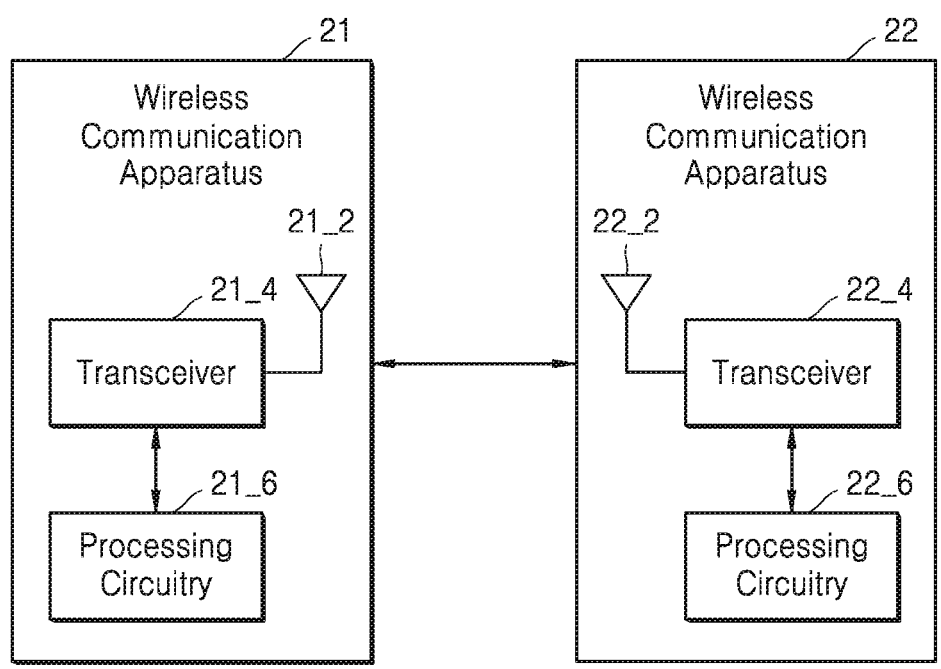
FIG. 2 is a block diagram illustrating a wireless communication system according to an embodiment of the inventive concept.

FIG. 2 is a block diagram illustrating a wireless communication system 20 according to an embodiment of the inventive concept. The block diagram of FIG. 2 illustrates a first wireless communication apparatus 21 and a second wireless communication apparatus 22 that communicate with each other in the wireless communication system 20. Each of the first wireless communication apparatus 21 and the second wireless communication apparatus 22 of FIG. 2 may be any device that communicates in the wireless communication system 20 and may be referred to as a device for wireless communication.

In some embodiments, each of the first wireless communication apparatus 21 and the second wireless communication apparatus 22 may be an access point or a station of a WLAN system. Generally, each of the first wireless communication apparatus 21 and the second wireless communication apparatus 22 may be an access point, station, personal computer, laptop computer, mainframe computer, palmtop computer, personal assistant, mobile device, or any other suitable processing apparatus.

Referring to FIG. 2, the first wireless communication apparatus 21 may include an antenna 212, a transceiver 214, and a processing circuitry 21_6. In some embodiments, the antenna 212, the transceiver 21_4, and the processing circuitry 216 may be included in one package or may be included in different packages, respectively. The second wireless communication apparatus 22 may also include an antenna 22_2, a transceiver 22_4, and a processing circuitry 22_6. Hereinafter, redundant descriptions of the first wireless communication apparatus 21 and the second wireless communication apparatus 22 will be omitted.

The antenna 212 may receive a signal from the second wireless communication apparatus 22 and provide the signal to the transceiver 214, and may transmit a signal provided from the transceiver 21_4 to the second wireless communication apparatus 22. Antennas 21_1 and 212 may each include a single antenna, or more than one antenna, which may be capable of concurrently transmitting or receiving multiple wireless transmissions. In some cases, a wireless communication device may include an antenna array. In some embodiments, the antenna 21_2 may include a plurality of antennas for multiple input multiple output (MIMO). Also, in some embodiments, the antenna 21_2 may include a phased array for beamforming.

Transceivers 21_4 and 224 may communicate bi-directionally, via antennas, wired, or wireless links as described above. For example, transceivers 21_4 and 22_4 may each represent a wireless transceiver and may communicate bi-directionally with another wireless transceiver. Transceivers 21_4 and 224 may also include or be connected to a modem to modulate the packets and provide the modulated packets to for transmission, and to demodulate received packets. In some examples, transceivers 21_4 and 224 may be tuned to operate at specified frequencies. For example, a modem can configure transceivers 21_4 and 22_4 to operate at a specified frequency and power level based on the communication protocol used by the modem. In some cases, a modem may perform functions related to modulation and demodulation of communication signals.

The transceiver 21_4 may process a signal received from the second wireless communication apparatus 22 through the antenna 21_2 and may provide the processed signal to the processing circuitry 21_6. Additionally, or alternatively, the transceiver 21_4 may process the signal provided from the processing circuitry 216 and output the processed signal through the antenna 21_2. In some embodiments, the transceiver 21_4 may include an analog circuit such as a low noise amplifier, a mixer, a filter, a power amplifier, an oscillator, etc. In some embodiments, the transceiver 21_4 may process a signal received from the antenna 21_2 and/or a signal received from the processing circuitry 216 based on the control of the processing circuitry 216.

The processing circuitry 21_6 may extract information transmitted by the second wireless communication apparatus 22 by processing the signal received from the transceiver 21_4. For example, the processing circuitry 216 may extract information by demodulating and/or decoding the signal received from the transceiver 21_4. Additionally, or alternatively, the processing circuitry 216 may generate a signal including information to be transmitted to the second wireless communication apparatus 22 and provide the signal to the transceiver 21_4. For example, the processing circuitry 21_6 may provide a signal generated by encoding and/or modulating data to be transmitted to the second wireless communication apparatus 22 to the transceiver 21_4. In some embodiments, the processing circuitry 216 may include a programmable component, such as a central processing unit (CPU), a digital signal processor (DSP), etc., may include a reconfigurable component, such as a field programmable gate array (FPGA), etc., and may include a component that provides a fixed function, such as an intellectual property core.

Processing circuitry 216 and processing circuitry 226 may include, or may be implemented by, a processor or intelligent hardware device (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some cases, software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

In some embodiments, the processing circuitry 21_6 may include or access memory that stores data and/or a series of instructions. Herein, the transceiver 21_4 and/or the processing circuitry 216 performing operations may be referred to as the first wireless communication apparatus 21 performing the corresponding operations. Accordingly, operations performed by the access point may be performed by a transceiver and/or processing circuitry included in the access point, and operations performed by the station may be performed by a transceiver and/or processing circuitry included in the station.

Figure 3:
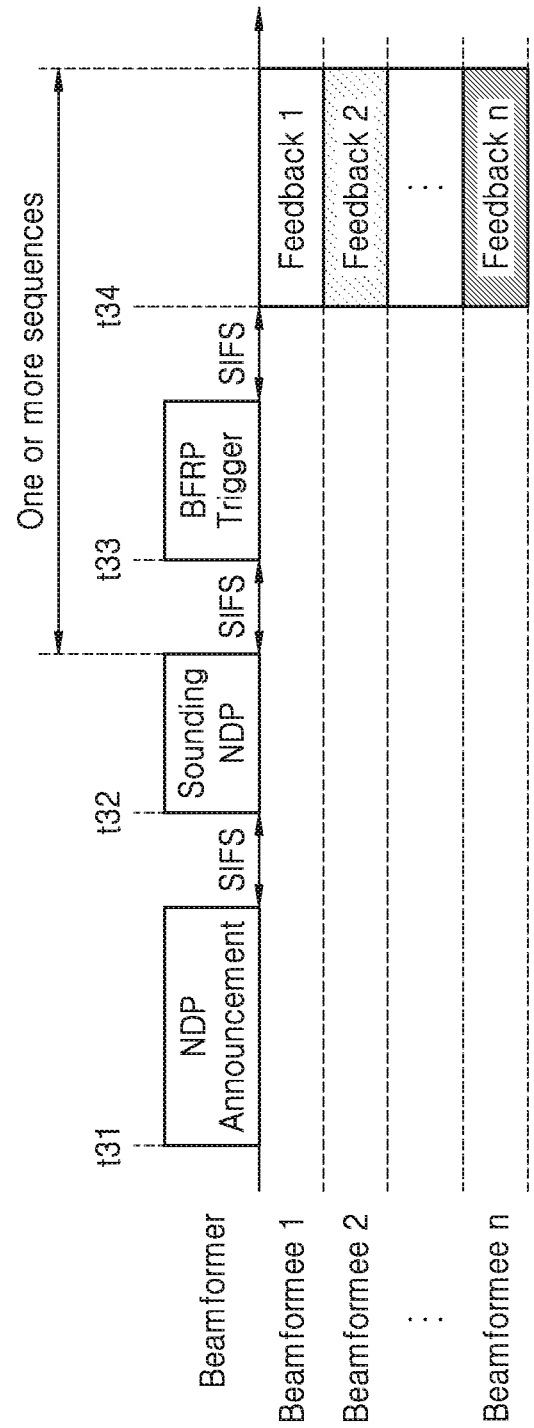
FIG. 3 is a timing diagram illustrating channel sounding according to an embodiment of the inventive concept.

FIG. 3 is a timing diagram illustrating channel sounding according to an embodiment of the inventive concept. The timing diagram of FIG. 3 illustrates channel sounding performed by a beamformer and first to n-th beamformees (n is an integer greater than 1). In an example of FIG. 3, the first to n-th beamformees may support different protocol standards, respectively. In some embodiments, the beamformer may be an access point, and each of the first through n-th beamformees may be a station. The embodiments of the inventive concept are not limited to the channel sounding of FIG. 3.

A sounding protocol may refer to a procedure for a beamformer to receive channel state information fed back from a beamformee. Referring to FIG. 3, at time t31, the beamformer may provide a null data packet or null data physical layer protocol data unit (PPDU) (NDP) announcement frame to the first to n-th beamformees. For example, the access point may provide an NDP announcement frame indicating transmission of a sounding NDP to the first to n-th beamformees to obtain channel state information of downlink. The NDP announcement frame may be a control frame, and the first to n-th beamformees may prepare for reception of the sounding NDP based on the NDP announcement frame. An example of the NDP announcement frame will be described later with reference to FIG. 4.

At time t32, the beamformer may transmit the sounding NDP to the first to n-th beamformees. For example, the access point may provide the NDP announcement frame to the first to n-th beamformees. Then, the access point may transmit the sounding NDP to the first to n-th beamformees after a short interframe space (SIFS) time. The first to n-th beamformees may estimate a downlink channel based on the sounding NDP and may generate information about a channel state. In some embodiments, as described below with reference to FIG. 5, an aggregated PPDU including NDPs respectively corresponding to different protocol standards may be provided to the first to n-th beamformees. Accordingly, channel sounding with beamformees supporting different protocol standards may be performed simultaneously, and the efficiency of channel sounding may increase. Examples of the sounding NDP will be described later with reference to FIGS. 5 and 6.

At time t33, the beamformer may provide a beamforming report poll (BFRP) trigger frame to the first to n-th beamformees. For example, the access point may transmit the sounding NDP to the first to n-th beamformees, and then provide the BFRP trigger frame triggering uplink transmission of the first to n-th beamformees to the first to n-th beamformees. The BFRP trigger frame may include information used for the first to n-th beamformees to communicate channel state information back to the beamformer, which may be the access point. For example, the BFRP trigger frame may include information about resources to be used in uplink transmission.

At time t34, the first to n-th beamformees may provide first to n-th feedback frames to the beamformer. For example, each of the first to n-th beamformees may provide a compressed beamforming/channel quality indicator (CQI) frame including the channel state information generated by channel estimation to the beamformer. Compressed beamforming/CQI frame may include information about a signal-to-noise ratio (SNR) with respect to a space-time stream and information about a compressed beamforming feedback matrix with respect to a subcarrier.

Figure 4:
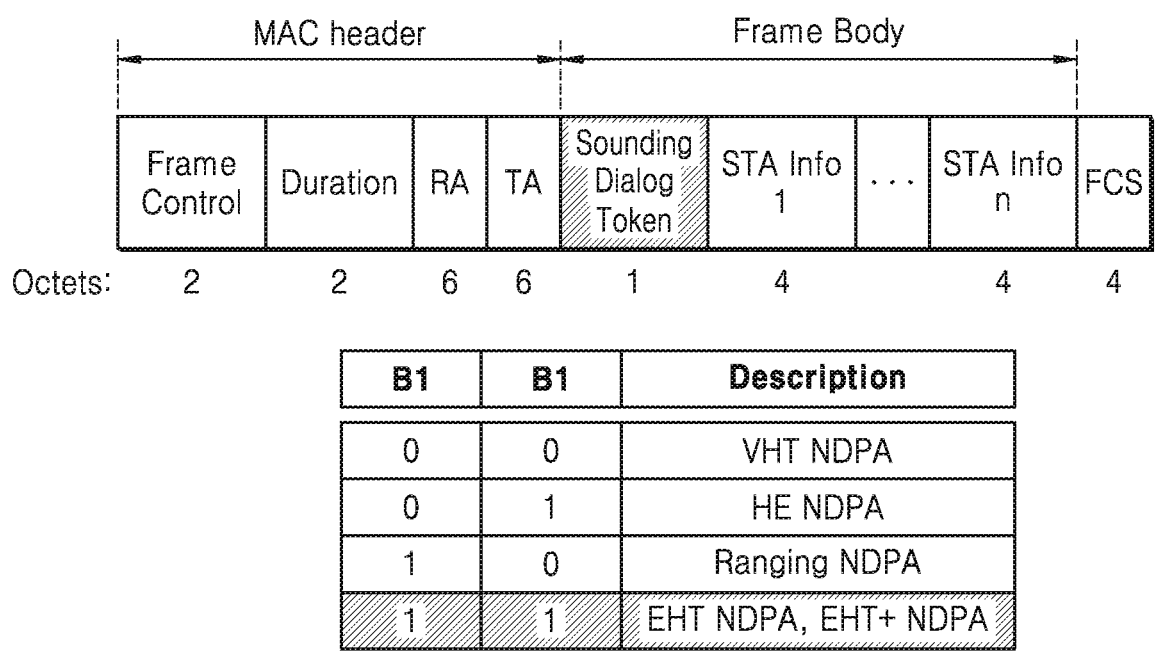
FIG. 4 is a diagram illustrating a null data packet (NDP) or null data physical layer protocol data unit (PPDU) announcement frame according to an embodiment of the inventive concept.

FIG. 4 is a diagram illustrating an NDP announcement frame according to an embodiment of the inventive concept. FIG. 4 illustrates a sounding dialog token field included in an NDP announcement (hereinafter NDPA) frame. In some embodiments, the NDPA frame of FIG. 4 may be used in EHT and/or EHT+. Embodiments of the inventive concept are not limited to the NDPA frame of FIG. 4. Hereinafter, FIG. 4 will be described with reference to FIG. 3.

Wireless communication systems may implement a framing process for efficient communication between a transmitting device and a receiving device. For instance, at a transmitting device preparing a data packet for transmission, a media access control (MAC) layer may receive a MAC Service Data Unit (MSDU) and attach a MAC header to the MSDU, thereby constructing a MAC Protocol Data Unit (MPDU). The MAC header may include various information such as Source Addresses (SAs) and Destination Addresses (DAs). In some examples, the MSDU may be classified according to traffic characteristics and identified by Traffic Identifiers (TIDs). The MPDU is a PHY Service Data Unit (PSDU) and is transferred to a PHY layer. Then, a PHY header is attached to the PSDU, such that a PHY Protocol Data Unit (PPDU) is constructed.

As shown in FIG. 4, the NDPA frame may include a media access control (MAC) header, a frame body, and a frame check sequence (FCS) field. The NDPA frame may include a frame control field, a duration field, a receiver address (RA) field, and a transmitter address (TA) field in the MAC header, and may include a sounding dialog field and n STA information fields (n is an integer greater than zero) in the frame body. The NDPA frame may include information used for beamformees to perform channel sounding.

The frame control field may include information about a version of a MAC protocol and other additional control information. The duration field may include time information for setting a network allocation vector (NAV) or information about a user identifier (e.g., association identifier (AID)). The RA field may include address information of a beamformee that receives the NDPA frame Additionally, or alternatively, the TA field may include address information of a beamformer that transmits the NDPA frame. The sounding dialog token field may be referred to as a sounding sequence field and may include identification information of the NDPA frame as described below. The STA information field may be referred to as a user information field, and the NDPA frame may include first to n-th STA information fields respectively corresponding to first to n-th beamformees that receive the NDPA frame. Each of stations that receive the NDPA frame may identify whether each station is a beamformee through an identifier (e.g., AID12 subfield) included in the STA information field.

As will be described later with reference to FIG. 4, etc., for an aggregated PPDU including a plurality of NDPs, the sounding dialog token field may have a value commonly corresponding to two or more standards. For example, as shown in the table of FIG. 4, a sounding dialog token frame may include 2-bits 'B0 and B1' indicating protocol standards on which the NDPA frame is based. In some embodiments, the bit 'B0' may be referred to as a 'Ranging' bit and the bit 'B1' may be referred to as an 'EH/VHT' bit. As shown in FIG. 4, 2-bit '00' may indicate an 802.11ac NDPA frame referred to as very high throughput (VHT), '01' may indicate a HE NDPA frame, '10' may indicate 'Ranging' NDPA frame, for example, a 802.11az NDPA frame, and '11' may indicate an EHT NDPA frame as well as an EHT+ NDPA frame. Accordingly, a station supporting EHT (hereinafter referred to as an EHT station) and a station supporting EHT+ (hereinafter referred to as an EHT+ station) may commonly identify the NDPA frame, and may estimate a channel based on the aggregated PPDU including NDPs.

Because requirements of EHT following HE are currently being defined, unlike an example in which EHT and subsequent EHT+ correspond to a common value in the sounding dialog token field as shown in FIG. 4, an example in which HE and EHT correspond to a common value in the sounding dialog token field. However, the embodiments of the inventive concept may be applied between any different protocol standards.

Figure 5:
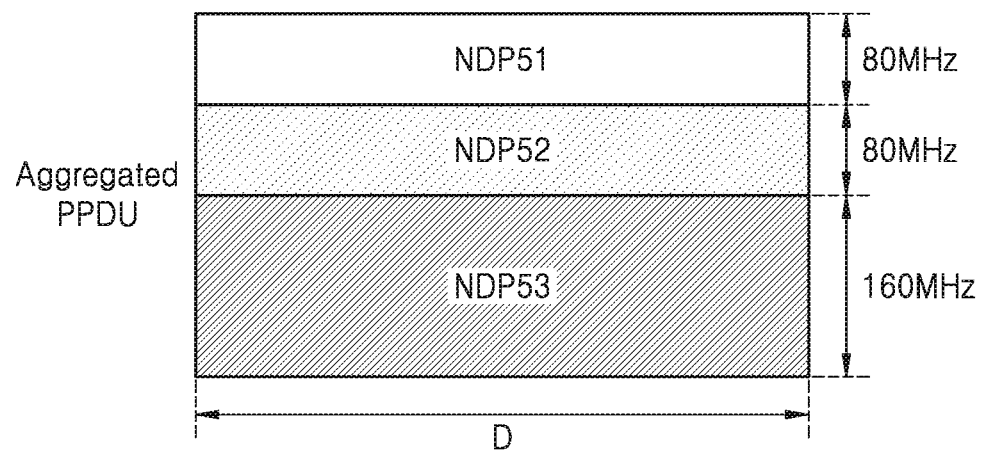
FIG. 5 is a diagram illustrating an aggregated PPDU according to an embodiment of the inventive concept.

FIG. 5 is a diagram illustrating an aggregated PPDU according to an embodiment of the inventive concept. As described above with reference to FIG. 3, a beamformer (e.g., an access point) may transmit an NDPA frame and then transmit the aggregated PPDU including a plurality of NDPs corresponding to different protocol standards to a plurality of beamformees (e.g., stations). As shown in FIG. 5, the aggregated PPDU may include a first NDP NDP51, a second NDP NDP52, and a third NDP NDP53. In some embodiments, different from that shown in FIG. 5, the aggregated PPDU may include NDPs exceeding two or three NDPs.

In some embodiments, at least two NDPs among the plurality of NDPs included in the aggregated PPDU may respectively correspond to different protocol standards. For example, the first NDP NDP51 and the second NDP NDP52 may be based on HE (or EHT), while the third NDP NDP53 may be based on EHT (or EHT+). In some embodiments, the plurality of NPDs included in the aggregated PPDU may be transmitted through different frequency bands, respectively. For example, as shown in FIG. 5, the aggregated PPDU may be transmitted in a bandwidth of 320 MHz, the first NDP NPD1 may be transmitted through upper 80 MHz of upper 160 MHz, the second NDP NDP52 may be transmitted through lower 80 MHz of upper 160 MHz, and the third NDP NDP53 may be transmitted through lower 160 MHz.

In some embodiments, the NDPs included in the aggregated PPDU may have the same duration. For example, as shown in FIG. 5, the first NDP NDP51, the second NDP NDP52, and the third NDP NDP53 may have the same duration D. A PPDU corresponding to a new protocol standard may include more information than a PPDU corresponding to a legacy protocol standard for higher throughput. Accordingly, the new protocol standard may include a larger number of fields and/or may include a field with a longer length. As a result, the PPDU corresponding to the new protocol standard may have a longer duration than the PPDU corresponding to the legacy protocol standard. However, as will be described later with reference to the drawings, the NDP, which may be one of PPDUs corresponding to the new protocol standard, may have the same duration as the NDP corresponding to the legacy protocol standard, and accordingly, as shown in FIG. 5, the aggregated PPDU including the plurality of NDPs respectively corresponding to different protocol standards may be used for channel sounding.

Figure 6:
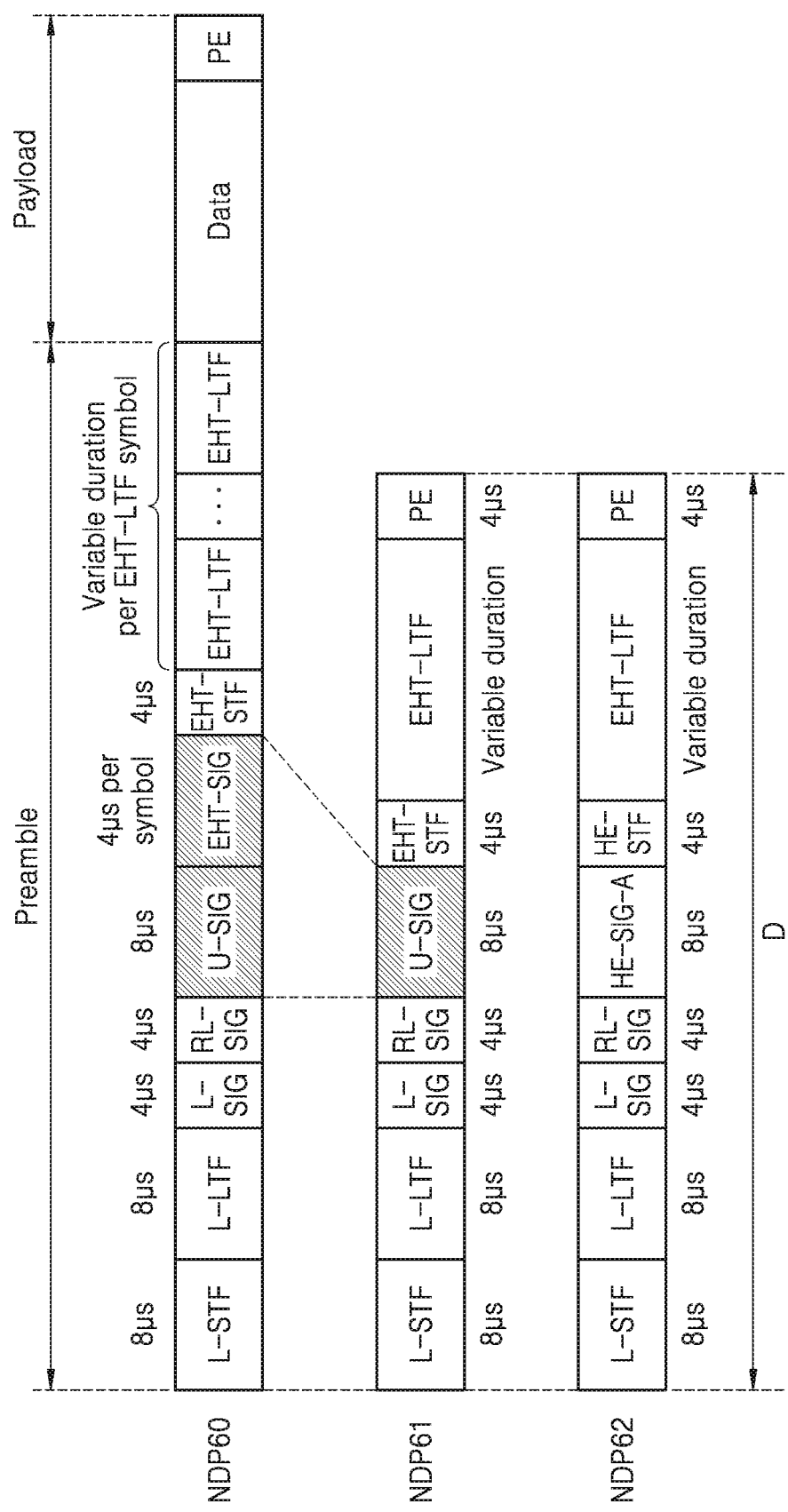
FIG. 6 is a diagram illustrating a structure of an NDP according to an embodiment of the inventive concept.

FIG. 6 is a diagram illustrating a structure of an NDP according to an embodiment of the inventive concept. FIG. 6 illustrates a non-NDP NDP60 and a first NDP NDP61 based on a new protocol standard, and a second NDP NDP62 based on a legacy protocol standard. Hereinafter, the NDP NDP60 and the first NDP NDP61 are assumed to be based on EHT, and the second NDP NDP62 is assumed to be based on HE. Hereinafter, a redundant description of FIG. 6 will be omitted.

Referring to FIG. 6, the non-NDP NDP60 may include a preamble including training fields and signaling fields and a payload including a data field. The non-NDP NDP60 may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF) and an extremely high throughput-long training field (EHT-LTF) in the preamble. Additionally, or alternatively, the non-NDP NDP60 may include a data field and a packet extension (PE) field in the payload.

The L-STF may include a short training OFDM symbol, and may be used for frame detection, automatic gain control (AGC), diversity detection, and coarse frequency/time synchronization. The L-LTF may include a long training OFDM symbol and may be used for fine frequency/time synchronization and channel estimation. The L-SIG field may be used for transmission of control information and may include information about a data rate and a data length. In some embodiments, the L-SIG field may be repeated in the RL-SIG field.

The U-SIG field may include control information common to at least one user receiving the non-NDP NDP60, and may correspond to the HE-SIG-A field of HE. An example of the U-SIG field will be described later with reference to FIG. 7. The EHT-SIG field may have a variable Modulation and Coding Scheme (MCS) and length, and may correspond to HE-SIG-B of HE. An example of EHT-SIG will be described later with reference to FIG. 8. The EHT-STF may be provided to perform automatic gain control in a receiving side (e.g., a user) that receives the non-NDP NDP60.

The first NDP NDP61 may have a structure in which the data field is omitted from the non-NDP NDP60. Additionally, or alternatively, the first NDP NDP61 may include a field in which the U-SIG field and the EHT-SIG field of the non-NDP NDP60 are merged, for example, the U-SIG field. As will be described later with reference to FIGS. 7 and 8, a part of the information included in the EHT-SIG field of the non-NDP NDP60 may be used in the first NDP NDP61, and accordingly, the U-SIG field of the first NDP NDP61 may include at least one subfield included in the EHT-SIG field. Therefore, the EHT-SIG field may be omitted from the first NDP NDP61. As a result, the first NDP NDP61 may have the same duration D as the second NDP NDP62, and the first NDP NDP61 and the second NDP NDP62 may be included in the aggregated PPDU. Herein, the U-SIG field commonly included in the non-NDP NDP60 and the first NDP NDP61 may be referred to as a first field, and the EHT-SIG field omitted from the first NDP NDP61 may be referred to as a second field.

FIG. 7 is a diagram illustrating an example of a U-SIG field according to an embodiment of the inventive concept, and FIG. 8 is a diagram illustrating an example of an EHT-SIG field according to an embodiment of the inventive concept. A table of FIG. 7 shows subfields included in U-SIG included in an EHT-based PPDU, and a table of FIG. 8 shows subfields included in a common information field of EHT-SIG included in an EHT-based NDP. The common information field of EHT-SIG included in a non-NDP, and the common information field of EHT-SIG included in an NDP may be defined differently in the EHT.

Referring to FIG. 7, the U-SIG field may include 26-bit U-SIG-1 and 26-bit U-SIG-2, and as will be described later with reference to FIG. 11, each of U-SIG-1 and U-SIG-2 may correspond to one symbol. Each of U-SIG-1 and U-SIG-2 may include a plurality of subfields defined in EHT. For example, as shown in FIG. 7, U-SIG-1 may include 'PHY Version Identifier', 'BW', 'UL/DL', 'BSS Color', 'TXOP', 'Disregard' and 'Validate'. Additionally, or alternatively, U-SIG-2 may include 'PPDU Type And Compression Mode', 'Validate', 'Punctured Channel Info', 'Validate', 'EHT-SIG MCS', 'Number of EHT-SIG Symbols', 'CRC' and 'Tail'.

In some embodiments, at least one of a plurality of subfields included in the U-SIG field may be redundant in the NDP. For example, as shown in FIG. 7, 'EHT-SIG MCS' and 'Number of EHT SIG Symbols' among the subfields included in U-SIG-2 of the U-SIG field may be used in the non-NDP but may not be used in the NDP.

Referring to FIG. 8, the common information field of the EHT-SIG field may include a plurality of subfields defined in the EHT. For example, as shown in FIG. 8, the common information field of the EHT-SIG field may include 'Spatial Reuse', 'GI+LTF Size', 'Number of EHT-LTF Symbols', 'NSS', 'Beamformed', 'Disregard', 'CRC' and 'Tail'.

In some embodiments, at least one of the plurality of subfields included in the common information field of the EHT-SIG field may be unnecessary in the NDP. For example, as shown in FIG. 8, 'Spatial Reuse', 'NSS' and 'Disregard' among the subfields included in the common information field of the EHT-SIG field may be used in the non-NDP but may not be used in the NDP. Accordingly, as will be described later with reference to FIGS. 9A, 9B and 10, at least one (e.g., 'EHT-SIG MCS' and 'Number of EHT SIG Symbols') of the subfields included in U-SIG field of the non-NDP may be replaced with at least one subfield (e.g., 'GI+LTF Size', 'Number of EHT-LTF Symbols' and 'Beamformed') of the EHT-SIG field in the U-SIG field of the NDP. Accordingly, the EHT-SIG field may be omitted in the NDP, and the NDP may have the same duration as the NDP of a legacy protocol standard.

FIGS. 9A and 9B are diagrams illustrating subfields included in a U-SIG field according to embodiments of the inventive concept. Each of tables of FIGS. 9A and 9B indicates values of 'UL/DL' and 'PPDU Type And Compression Mode' among the subfields included in the U-SIG field and information corresponding thereto. Hereinafter, redundant descriptions of FIGS. 9A and 9B will be omitted.

The U-SIG field may include at least one subfield indicating a type of a PPDU including the U-SIG field. For example, as described above with reference to FIG. 7, the U-SIG field may include 1-bit 'UL/DL' and 2-bit 'PPDU Type And Compression Mode' in U-SIG-1. Additionally, or alternatively, values of 'UL/DL' and 'PPDU Type And Compression Mode' may indicate the type of PPDU. Accordingly, the NDP may include at least one subfield with a value indicating the NDP as one of types of PPDU in the U-SIG field, and as a result, as will be described later with reference to FIG. 10, may configure the U-SIG field in the NDP differently from the non-NDP.

Referring to FIG. 9A, 'UL/DL' may indicate downlink or uplink, and 'PPDU Type And Compression Mode' may indicate one of 'DL OFDMA', 'SU', 'DL MU-MIMO' and 'NDP' in the downlink (UL/DL=0), and indicate one of 'UL OFDMA', 'SU' and 'NDP' in the uplink (UL/DL=1). Accordingly, in the 'PPDU Type And Compression Mode' (e.g., 2-bit '11'), the PPDU may indicate the NDP independently of the 'UL/DL'.

Referring to FIG. 9B, in some embodiments, a beamformer may be limited to an access point, and an access point may transmit an NDP. Therefore, the NDP may be used in the downlink. As shown in FIG. 9B, 'PPDU Type And Compression Mode' may indicate one of 'DL OFDMA', 'SU', 'DL MU-MIMO' and 'NDP' in the downlink (UL/DL=0). and may indicate 'UL OFDMA' or 'SU' in the uplink (UL/DL=1). Accordingly, 'PPDU Type And Compression Mode' (e.g., 2-bit '11') may indicate that the PPDU is the NDP in the downlink (UL/DL=0).

FIG. 10 is a diagram illustrating a U-SIG field according to an embodiment of the inventive concept. A table of FIG. 10 shows the U-SIG field included in a non-NDP and the U-SIG field included in an NDP.

As described above with reference to FIG. 9, at least one subfield included in the U-SIG field may indicate that a PPDU is an NDP. For example, 1-bit 'UL/DL' and 2-bit 'PPDU Type And Compression Mode' included in U-SIG-2 may indicate that the PPDU is an NDP. As shown in FIG. 10, when 'UL/DL' and 'PPDU Type And Compression Mode' indicate non-NDPs, U-SIG-2 of the U-SIG field may include 7-bits for 'EHT-SIG MCS' and 'Number of EHT-SIG Symbols'. Meanwhile, when 'UL/DL' and 'PPDU Type And Compression Mode' indicate NDPs, U-SIG-2 of the U-SIG field may include 7-bits for 'GI+LTF Size', 'Number of EHT-LTF Symbols' and 'Beamformed'. In some embodiments, as described above with reference to FIG. 8, 'GI+LTF Size', 'Number of EHT-LTF Symbols' and 'Beamformed' respectively have lengths of 2-bit, 3-bit and 1-bit. Therefore, when 'UL/DL' and 'PPDU Type And Compression Mode' indicate NDPs, the above-described 7-bit may include a reserved 1-bit.

FIG. 11 is a diagram illustrating a U-SIG field according to an embodiment of the inventive concept. A table of FIG. 11 shows modulation schemes of U-SIG-1 and U-SIG-2 of the U-SIG field. Hereinafter, FIG. 11 will be described with reference to FIG. 6.

As described above with reference to FIG. 6, 'EHT-STF' in a PPDU may be used by a receiving side, for example, a station, to perform automatic gain control. The station may sequentially process the fields included in the PPDU, and may identify information included in the field by demodulating and decoding symbols included in the fields. When the station receives the non-NDP NDP60 of FIG. 6, the station may sequentially process the U-SIG field, an EHT-SIG field, and an EHT-STF. Accordingly, the station may identify that the PPDU is of a non-NDP by demodulating and decoding the U-SIG field, and may identify that the EHT-SIG field is followed by the U-SIG field. Meanwhile, when the station receives the first NDP NDP61 of FIG. 6, the station may process the EHT-STF after processing the U-SIG field. Accordingly, the station may identify that the PPDU is of the non-NDP by demodulating and decoding the U-SIG field, and the EHT-STF is followed by the U-SIG field.

Time taken for demodulation and decoding may depend on the performance of the station. Therefore, due to the performance of the station that receives the first NDP NDP61, automatic gain control based on EHT-STF may be used to be performed before completing demodulation and decoding of the SIG field. The station may early identify that the PPDU is an NDP. The U-SIG field included in the NDP may include symbols modulated in different modulation schemes, respectively. For example, as shown in FIG. 11, U-SIG-1 and U-SIG-2 of the U-SIG field included in the non-NDP may be modulated based on quadrature phase shift keying (QPSK). Meanwhile, U-SIG-1 of the U-SIG field included in the NDP may be modulated based on QPSK, and U-SIG-2 of the U-SIG field may be modulated based on quadrature binary phase shift keying (QBPSK). Accordingly, the station may early identify that the PPDU is the NDP in a process of performing demodulation of the U-SIG-2 before performing decoding, and when the NDP is identified, may start performing automatic gain control based on the EHT-STF following the U-SIG field.

FIG. 12 is a diagram illustrating an example of a U-SIG field according to an embodiment of the inventive concept. A table of FIG. 12 shows the U-SIG field including a packet extension (PE) subfield.

In some embodiments, the PE field of the PPDU may have a variable duration. Accordingly, a beamformer, for example, an access point, may adjust the duration of an NDP so that durations of NDPs included in an aggregated PPDU match. As a result, the U-SIG field may include a subfield indicating the duration of the PE field. For example, as shown in FIG. 12, the U-SIG field may include m-bit 'Packet Extension Duration' (m is an integer greater than 0), and a value of 'Packet Extension Duration' may indicate one of a plurality of predefined durations. In some embodiments, the U-SIG field may include a 1-bit 'Packet Extension Duration' (m=1), and the PE field may have a duration of 4 μs or 8 μs. In some embodiments, the U-SIG field may include a 2-bit 'Packet Extension Duration' (m=2), and the PE field may have a duration of one of 4 μs, 8 μs, 12 μs, and 16 μs.

Figure 13:
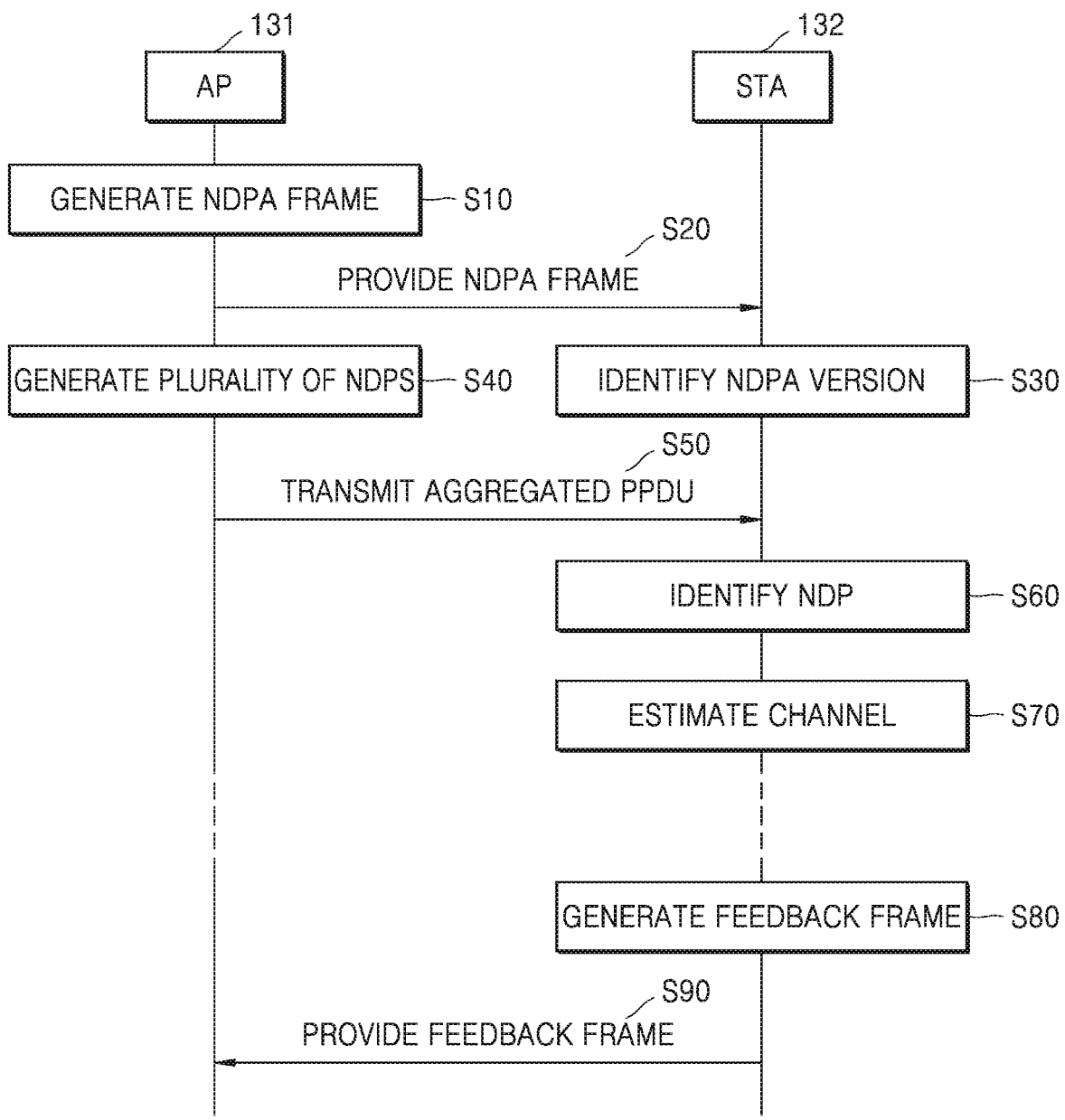
FIG. 13 is a message diagram illustrating a method for channel sounding based on an aggregated PPDU according to an embodiment of the inventive concept.

FIG. 13 is a message diagram illustrating a method for channel sounding based on an aggregated PPDU according to an embodiment of the inventive concept. The message diagram of FIG. 13 illustrates operations of an access point 131 as a beamformer and a station 132 as one of a plurality of beamformees over time. In some embodiments, the access point 131 and the station 132 may communicate based on the NDPA frame and/or the NDP described above with reference to the figures. As shown in FIG. 13, the method for channel sounding based on the aggregated PPDU may include a plurality of operations S10 to S90.

Referring to FIG. 13, in operation S10, the access point 131 may generate an NDPA frame. For example, the access point 131 may select a plurality of stations that will perform channel sounding (or provide beamforming) among associated stations, and generate the NDPA frame based on the selected plurality of stations. As described above with reference to FIG. 3, the NDPA frame may be a control frame, and the station 132 may prepare to receive a sounding NDP based on the NDPA frame. As described above with reference to FIG. 4, the NDPA frame may include a plurality of fields, in particular, a sounding dialog token subfield including a value indicating a version of the NDPA frame, i.e., a protocol standard on which the NDPA frame is based.

To provide NDPs to stations including the station 132 through the aggregated PPDU, the access point 131 may set the sounding dialog token subfield to a value that commonly indicates different standard protocols, and generate the NDPA frame including the set sounding dialog token subfield. Accordingly, the NDPs included in the aggregated PPDU transmitted to the station 132 in operation S50 to be described later may correspond to the same or different protocol standards that commonly correspond to the value included in the sounding dialog token subfield.

In operation 520, the access point 131 may provide the NDPA frame to the station 132. For example, the access point 131 may transmit the PPDU including the NDPA frame generated in operation S10 to the station 132, and the station 132 may receive the PPDU including the NDPA frame from the access point 131.

In operation S30, the station 132 may identify an NDPA version. For example, the station 132 may extract the NDPA frame from the PPDU received from the access point 131, and identify the NDPA version, for example, the protocol standard corresponding to the NDPA frame based on at least one field included in the NDPA frame. As described above, the station 132 may identify the protocol standard based on at least one bit of the sounding dialog token field included in the NDPA frame. Accordingly, the station 132 may identify a protocol standard corresponding to an NDP subsequently received from the access point 131.

In operation 540, the access point 131 may generate a plurality of NDPs. The access point 131 may generate NDPs to be provided to the plurality of stations selected in operation S10. As described above, the plurality of NDPs may correspond to the same protocol standard, or may correspond to two or more different protocol standards that share the value of the sounding dialog token subfield.

In some embodiments, at least one NDP of the plurality of NDPs may include a field merged from at least two fields included in a non-NDP, and accordingly, a field included in the non-NDP may be omitted from the NDP, and the NDP may have the same duration as other NDPs based on a legacy protocol standard. For example, as described above with reference to FIG. 6, the access point 131 may generate the first NDP NDP61 in which the EHT-SIG field is omitted, and the U-SIG included in the first NDP NDP61 include at least one subfield included in the EHT-SIG field.

In some embodiments, the access point 131 may modulate symbols of fields based on different modulation schemes so that automatic gain control is not delayed due to a field omitted in the NDP. For example, as described above with reference to FIG. 11, the access point 131 may generate symbols based on binary phase shift keying (BPSK) from values of subfields included in U-SIG-1 of the U-SIG field in the NDP, and may generate symbols based on QBPSK from values of subfields included in U-SIG-2 of the U-SIG field in the NDP.

In some embodiments, the access point 131 may set the subfield included in the field of the NDP to a value indicating that the PPDU is the NDP. For example, as described above with reference to FIG. 9, the access point 131 may set 'UL/DL' and/or 'PPDU Type And Compression Mode' included in the U-SIG field of the NDP to a value indicating the NDP.

In some embodiments, the access point 131 may generate an NDP including a packet extension field with a duration adjusted to have the same duration as other NDPs. For example, U-SIG of the NDP may include a subfield indicating the duration of the packet extension field, that is, 'Packet Extension Duration'. The access point 131 may set 'Packet Extension Duration' as one of values corresponding to various durations that increase in units of a symbol length (e.g., 4 μs).

In operation S50, the access point 131 may transmit the aggregated PPDU to the station 132, and the station 132 may receive the aggregated PPDU from the access point 131. A plurality of stations including the station 132 may receive the aggregated PPDU, and each of the plurality of stations may process an NDP corresponding thereto in the aggregated PPDU.

In operation S60, the station 132 may identify the NDP. In some embodiments, the station 132 may extract a field from the NDP corresponding thereto in the aggregated PPDU, and identify that the PPDU received in operation S50 is the NDP based on a value of a subfield included in the field. For example, as described above with reference to FIG. 9, the station 132 may identify the NDP based on values of 'UL/DL' and/or 'PPDU Type And Compression Mode' included in the U-SIG field of the NDP.

In some embodiments, the station 132 may extract a field from an NDP corresponding thereto in the aggregated PPDU, and may identify the NDP based on modulation schemes of symbols included in the field. For example, as described above with reference to FIG. 11, a symbol corresponding to U-SIG-1 of the U-SIG field in the NDP may be modulated based on BPSK, while a symbol corresponding to U-SIG-2 of the U-SIG field in the NDP may be modulated based on QBPSK. Before performing decoding, the station 132 may identify that the PPDU received in operation S50 is the NDP based on the symbol corresponding to U-SIG-2 of the U-SIG field in the NDP. When the modulated symbol is identified based on QBPSK, the station 132 may perform automatic gain control based on EHT-STF following the U-SIG field.

In step S70, the station 132 may perform channel estimation. For example, the station 132 may estimate a downlink channel based on the NDP received in operation S50. The station 132 may generate, based on the estimated channel, channel information, for example, information about an SNR with respect to a space-time stream, and a compressed beamforming feedback matrix with respect to a subcarrier.

In operation S80, the station 132 may generate a feedback frame. For example, the station 132 may generate the feedback frame including the channel information generated through channel estimation in operation S70. In some embodiments, the station 132 may generate a compressed beamforming/channel quality indicator (CQI) frame as the feedback frame. In some embodiments, as described above with reference to FIG. 3, the access point 131 may provide a BFRP trigger frame to a plurality of stations including the station 132 after transmitting the aggregated PPDU in operation S50. The BFRP trigger frame may trigger uplink transmission of the plurality of stations. The access point 131 may generate the feedback frame in response to the BFRP trigger frame.

In step S90, the station 132 may provide the feedback frame to the access point 131. For example, the station 132 may generate a PPDU including the feedback frame, and may transmit the PPDU to the access point 131 based on information included in the BFRP trigger frame.

Figure 14:
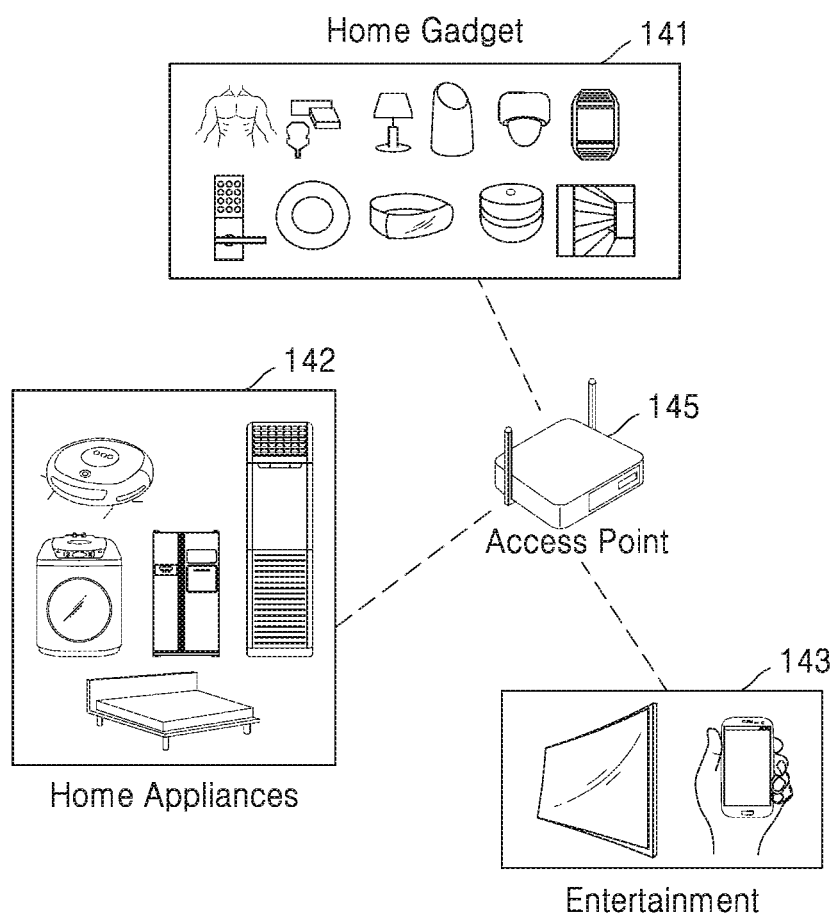
FIG. 14 is a diagram illustrating examples of an apparatus for wireless communication according to an embodiment of the inventive concept.

FIG. 14 is a diagram illustrating examples of an apparatus for wireless communication according to an embodiment of the inventive concept. FIG. 14 illustrates an Internet of Things (IoT) network system including a home gadget 141, home appliances 142, an entertainment device 143, and an access point 145.

In some embodiments, the apparatus for wireless communication of FIG. 14 may perform communication based on an NDPA frame described above with reference to the drawings, e.g., channel sounding. The access point 145 may sequentially provide the NDPA frame and an NDP to the home gadget 141, the home appliances 142, and/or the entertainment device 143. Additionally, or alternatively, the home gadget 141, the home appliances 142 and/or the entertainment device 143 may provide feedback information about a channel to the access point 145 based on the NDPA frame and the NDP sequentially received from the access point 145. Accordingly, the overhead for channel feedback with the home gadget 141, the home appliances 142, and/or the entertainment device 143 based on various protocol standards may be reduced, and as a result, the efficiency of the IoT network system may increase.

While the inventive concept has been particularly shown and described with reference to embodiments thereof, various changes in form and details may be made therein without departing from the spirit and scope of the following claims.

What is claimed is:

1. A method for wireless communication between a first apparatus and at least one second apparatus in a wireless local area network (WLAN), the method comprising:
    generating an aggregated physical layer protocol data unit (PPDU) comprising a first null data packet (NDP) based on a first protocol standard and a second NDP based on a second protocol standard, wherein the first NDP comprises a first set of fields based on the first protocol standard and the second NDP comprises a second set of fields different from the first set of fields based on the second protocol standard, wherein the first set of fields includes a merged field in which a plurality of fields of the first protocol standard are merged, and wherein the first NDP and the second NDP have a same duration based on the merged field; and
    transmitting the aggregated PPDU to the at least one second apparatus, wherein the first NDP and the second NDP are transmitted in different frequency bands.

2. The method of claim 1, wherein fields included in the first NDP and fields included in the second NDP are at least partially different.

3. The method of claim 1, wherein a non-NDP of the first protocol standard comprises a first SIG field and a second SIG field, and wherein the merged field of the first NDP corresponds to the first SIG field of the non-NDP and comprises at least one subfield of the second SIG field of the non-NDP.

4. The method of claim 3, wherein the merged field of the first NDP comprises at least one subfield with a value indicating that a PPDU is an NDP.

5. The method of claim 3, wherein the merged field of the first NDP comprises at least one symbol modulated based on a first modulation scheme and at least one symbol modulated based on a second modulation scheme.

6. The method of claim 3, wherein the first NDP comprises a packet extension field and the merged field of the first NDP comprises a subfield indicating a duration of the packet extension field.

7. The method of claim 1, further comprising:
    generating a null data packet announcement (NDPA) frame; and
    transmitting a PPDU comprising the NDPA frame to the at least one second apparatus, wherein the NDPA frame comprises a field with a value indicating the first protocol standard and the second protocol standard.

8. A first apparatus for communicating with at least one second apparatus in a wireless local area network (WLAN) system, the first apparatus comprising:
    a transceiver; and
    processing circuitry configured to:
        generate an aggregated physical layer protocol data unit (PPDU) comprising a first null data packet (NDP) based on a first protocol standard and a second NDP based on a second protocol standard, wherein the first NDP comprises a first set of fields based on the first protocol standard and the second NDP comprises a second set of fields different from the first set of fields based on the second protocol standard, wherein the first set of fields includes a merged field in which a plurality of fields of the first protocol standard are merged, and wherein the first NDP and the second NDP have a same duration based on the merged field; and
        transmit the aggregated PPDU to the at least one second apparatus through the transceiver, wherein the first NDP and the second NDP are transmitted in different frequency bands.

9. The first apparatus of claim 8, wherein the first NDP corresponds to a first SIG field among the first SIG field and a second SIG field included in a non-NDP, and comprises at least one subfield of the second SIG field of the non-NDP.

10. The first apparatus of claim 9, wherein the processing circuitry is configured to set at least one subfield included in the merged field of the first NDP to a value indicating that a PPDU is an NDP.

11. The first apparatus of claim 9, wherein the merged field of the first NDP comprises a first symbol and a second symbol, and wherein the processing circuitry is configured to generate the first symbol based on a first modulation scheme and generate the second symbol based on a second modulation scheme.

12. The first apparatus of claim 9, wherein the first NDP comprises a packet extension field and the processing circuitry is configured to set a subfield included in the merged field of the first NDP to a value indicating a duration of the packet extension field.

13. The first apparatus of claim 8, wherein the processing circuitry is configured to:
set a field included in a null data packet announcement (NDPA) frame to a value indicating the first protocol standard and the second protocol standard; and
transmit a PPDU comprising the NDPA frame to the at least one second apparatus through the transceiver.

14. A second apparatus for communicating with at least one first apparatus in a wireless local area network (WLAN) system, the second apparatus comprising:
a transceiver; and
processing circuitry configured to:
receive, from the first apparatus through the transceiver, an aggregated physical layer protocol data unit (PPDU) including a first null data packet (NDP) based on a first protocol standard and a second NDP based on a second protocol standard, wherein the first NDP comprises a first set of fields based on the first protocol standard and the second NDP comprises a second set of fields different from the first set of fields based on the second protocol standard, wherein the first set of fields includes a merged field in which a plurality of fields of the first protocol standard are merged, and wherein the first NDP and the second NDP have a same duration based on the merged field; and
estimate a channel based on the first NDP, wherein the first NDP and the second NDP are transmitted in different frequency bands.

15. The second apparatus of claim 14, wherein the first NDP corresponds to a first SIG field among the first SIG field and a second SIG field included in a non-NDP, and comprises at least one subfield of the second SIG field of the non-NDP.

16. The second apparatus of claim 15, wherein the processing circuitry is configured to identify a value indicating that a PPDU is an NDP, and wherein the value is in a subfield included in the merged field of the first NDP.

17. The second apparatus of claim 15, wherein the merged field of the first NDP comprises a first symbol and a second symbol, and wherein the processing circuitry is configured to:
demodulate the first symbol and the second symbol based on a first modulation scheme; and
identify whether the second symbol is modulated based on a second symbol modulation scheme.

18. The second apparatus of claim 17, wherein, when the second symbol is identified as being modulated based on the second symbol modulation scheme, the processing circuitry is configured to perform automatic gain control based on a third field of the first NDP subsequent to the first field of the first NDP.

19. The second apparatus of claim 15, wherein the first NDP comprises a packet extension field, and the processing circuitry is configured to identify a duration of the packet extension field based on a value of a subfield included in the merged field of the first NDP.

20. The second apparatus of claim 14, wherein the processing circuitry is configured to:
generate a feedback frame comprising information about the estimated channel; and
transmit a PPDU comprising the feedback frame to the first apparatus through the transceiver.

* * * * *